United States Patent
Zhang et al.

(10) Patent No.: US 11,480,688 B2
(45) Date of Patent: Oct. 25, 2022

(54) SATELLITE DIFFERENTIAL AUXILIARY DATA TRANSMISSION METHOD, LOCATION METHOD AND APPARATUS

(71) Applicant: DATANG MOBILE COMMUNICATIONS EQUIPMENT CO.,LTD., Beijing (CN)

(72) Inventors: Dajun Zhang, Beijing (CN); Haiyang Quan, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 0 days.

(21) Appl. No.: 17/275,196

(22) PCT Filed: Jun. 21, 2019

(86) PCT No.: PCT/CN2019/092396
§ 371 (c)(1),
(2) Date: Mar. 11, 2021

(87) PCT Pub. No.: WO2020/052313
PCT Pub. Date: Mar. 19, 2020

(65) Prior Publication Data
US 2022/0057524 A1  Feb. 24, 2022

(30) Foreign Application Priority Data

Sep. 14, 2018  (CN) .......................... 201811075546.8

(51) Int. Cl.
*G01S 19/07* (2010.01)
*G01S 5/00* (2006.01)
(Continued)

(52) U.S. Cl.
CPC ............ *G01S 19/071* (2019.08); *G01S 5/009* (2013.01); *G01S 5/0236* (2013.01); *G01S 19/41* (2013.01)

(58) Field of Classification Search
CPC ... H04W 64/00; H04W 64/003; G01S 5/0236; G01S 5/10; G01S 5/00; G01S 19/05; G01S 19/40
See application file for complete search history.

(56) References Cited

U.S. PATENT DOCUMENTS 10,327,109 B1 * 6/2019 Maheshwari ......... H04W 4/029
2011/0279312 A1 * 11/2011 Thomson ................ G01S 19/05
342/357.47
(Continued)

FOREIGN PATENT DOCUMENTS

CN  1695322 A  11/2005
CN  101828127 A  9/2010
(Continued)

OTHER PUBLICATIONS

3GPP TS 38.305 V15.0.0, 3rd Generation Partnership Project;Technical Specification Group Radio Access Network; NG Radio Access Network (NG-RAN);Stage 2 functional specification of User Equipment (UE) positioning in NG-RAN, Release 15, total 57 pages, Jun. 2018.

Primary Examiner — Dung Hong
(74) Attorney, Agent, or Firm — Kilpatrick Townsend & Stockton, LLP

(57) ABSTRACT

The present disclosure provides a satellite differential auxiliary data transmission method, a location method and an apparatus, for ensuring that a better high-precision Beidou satellite location service can be provided on the basis of 5G or other developable technology networks. The satellite differential auxiliary data transmission method includes an LMF acquiring auxiliary information related to a Beidou
(Continued)

```
┌─────────────────────────────────────────┐
│ Receiving the assistance information    │
│ for UE location calculation, where the  │      S201
│ assistance information includes         │
│ differential assistance data            │
└─────────────────────────────────────────┘
                    │
                    ▼
┌─────────────────────────────────────────┐
│ Broadcasting or updating a positioning  │
│ system message according to the         │      S202
│ assistance information, wherein the     │
│ positioning system message carries the  │
│ differential assistance data            │
└─────────────────────────────────────────┘
``` satellite location system, and calculating auxiliary information for an UE location calculation, the auxiliary information including differential auxiliary data, and sending, via broadcast, to a base station the auxiliary information for the UE location calculation.

17 Claims, 8 Drawing Sheets

(51) Int. Cl.
  G01S 5/02 (2010.01)
  G01S 19/41 (2010.01)

(56) References Cited

U.S. PATENT DOCUMENTS

| | | |
|---|---|---|
| 2011/0312341 A1 | 12/2011 | Moton, Jr. et al. |
| 2018/0098279 A1 | 4/2018 | Edge |
| 2018/0199160 A1 | 7/2018 | Edge |
| 2018/0324740 A1* | 11/2018 | Edge ................. H04W 12/0431 |
| 2019/0037338 A1* | 1/2019 | Edge ....................... H04W 4/20 |
| 2019/0268725 A1* | 8/2019 | Edge .................... H04W 64/00 |
| 2020/0053690 A1* | 2/2020 | Fischer ............... H04W 64/003 |
| 2020/0084569 A1* | 3/2020 | Jain ........................ H04W 4/02 |

FOREIGN PATENT DOCUMENTS

| | | | | |
|---|---|---|---|---|
| CN | 102739301 A | 10/2012 | | |
| CN | 102844677 A | 12/2012 | | |
| CN | 107478221 A | 12/2012 | | |
| CN | 107182262 B | 6/2014 | | |
| CN | 104076377 A | 10/2014 | | |
| CN | 104661307 A | 5/2015 | | |
| CN | 104796982 A | 7/2015 | | |
| CN | 105759291 A | 7/2016 | | |
| CN | 106324645 A | 1/2017 | | |
| CN | 108205150 A | 6/2018 | | |
| CN | 110999435 A * | 4/2020 | ............ | H04W 4/029 |

* cited by examiner

SATELLITE DIFFERENTIAL AUXILIARY DATA TRANSMISSION METHOD, LOCATION METHOD AND APPARATUS

The present application is a national phase entry under 35 U.S.C. § 371 of International Application No. PCT/CN2019/092396, filed on Jun. 21, 2019, which claims the priority from Chinese Patent Application No. 201811075546.8, filed with the Chinese Patent Office on Sep. 14, 2018 and entitled "Satellite Differential Assistance data Transmission Method, Positioning method and Apparatus", which is hereby incorporated by reference in its entirety.

FIELD

The present application relates to the field of communication technology, and in particular to a satellite differential assistance data transmission method, a positioning method and an apparatus.

BACKGROUND

The Location Based Service (LBS) is a service of obtaining the terminal location information through a wireless communication network or other positioning systems and then providing users with various location-related information in combination with a geographic information system. At present, the outdoor positioning technology (Beidou satellite positioning technology) based on the Global Navigation Satellite System (GNSS) has been widely used in various fields, including current mobile terminals, but there is a problem that the accuracy is not high enough.

SUMMARY

The embodiments of the present application provide a satellite differential assistance data transmission method, a positioning method and an apparatus, to ensure that better Beidou satellite positioning service with high precision can be provided on the basis of 5G or other developable technical networks.

At the Location Management Function (LMF) entity side, an embodiment of the present application provides a satellite differential assistance data transmission method, including:

acquiring and calculating assistance information related to a Beidou satellite positioning system, where the assistance information includes differential assistance data;

sending the assistance information related to the Beidou satellite positioning system to a base station through broadcasting.

With this method, the base station can broadcast the assistance information related to the Beidou satellite positioning system including the differential assistance data to the UE, to ensure that the Beidou satellite positioning service with high precision can be better provided on the basis of 5G or other developable technical networks.

The differential assistance data is composed of observation data or correction data of the measurement station, providing the moving station with the double-difference reference station data or directly with the correction data, to eliminate the errors related to the distance of the measurement station.

Here, the differential assistance data includes but not limited to: reference time, reference position, ionospheric model, Real-Time Kinematic (RTK) related parameters.

In one embodiment, the assistance information for User Equipment (UE) location calculation further includes an Identity of Global Navigation Satellite System (GNSS ID) and an Identity of Space Based Augmentation System (SBAS ID).

Here, the SBAS system monitors the navigation satellites by a large number of widely distributed differential stations (with known positions), obtains the original positioning data (pseudorange, observed value of carrier phase, etc.), and sends it to the central processing facility (primary control station). The latter obtains various positioning correction information of each satellite through calculation, sends it to the Geostationary Earth Orbit (GEO) satellite through an upload station, and finally broadcasts the correction information to the majority of users, to achieve the purpose of improving the positioning accuracy.

In one embodiment, the assistance information for UE location calculation further includes an indication to confirm whether the differential assistance data is encrypted.

The indication of whether the differential assistance data is encrypted is set by the network side, and the decryption indication is carried by the LMF entity, and the UE decrypts the data according to the key with corresponding level.

In one embodiment, the LMF entity receives the assistance information sent by the base station for assisting in determining the differential assistance data for UE location calculation; and the differential assistance data is determined according to the assistance information for assisting in determining the differential assistance data for UE location calculation;

and the differential assistance data for UE location calculation refers to differential assistance data of a serving base station, or a serving cell, or a Transmission Point (TP) of a serving base station of a UE.

In one embodiment, the assistance information for assisting in determining the differential assistance data for UE location calculation includes:

geographic location information of the base station, or geographic location information of a cell of the base station, or geographic location information of the TP of the base station.

In the embodiment of the present application, the interaction of the assistance information between the LMF entity and the base station is required to calculate the Beidou-related assistance data, where the LMF entity calculates the differential numeric value of the base station according to the precise position information of the base station in combination with the differential data of adjacent satellite reference stations, and then transmits this numeric value to the UE as the positioning compensation value of the UE.

In one embodiment, the method further includes: acquiring the assistance information sent by a space based augmentation system for calculating the differential assistance data for UE location calculation, where the assistance information contains differential assistance data of the space based augmentation system.

Here, the space based augmentation system is, for example, the Beidou satellite reference station.

In one embodiment, the satellite differential assistance data transmission method provided by the embodiment of the present application further includes:

updating, by the LMF entity, the differential assistance data periodically, and sending the updated differential assistance data to the base station.

At the base station side, an embodiment of the present application provides a satellite differential assistance data transmission method, which includes:

receiving assistance information for UE location calculation, and the assistance information includes differential assistance data;

broadcasting or updating a positioning system message according to the assistance information, and the positioning system message carries the differential assistance data.

With this method, after receiving the assistance information sent from the LMF entity, the base station will trigger the broadcast or update of the positioning system message according to the broadcast cycle from the LMF or the indication on whether to enable the broadcast.

In one embodiment, the assistance information further includes a GNSS ID and an SBAS ID.

In one embodiment, the assistance information further includes an indication to confirm whether the differential assistance data is encrypted.

In one embodiment, the satellite differential assistance data transmission method provided by the embodiment of the present application further includes:

the base station sends the assistance information for assisting in determining the differential assistance data for UE location calculation to the LMF entity.

In one embodiment, the assistance information for assisting in determining the differential assistance data for UE location calculation includes:

geographic location information of a base station, or geographic location information of a cell of a base station, or geographic location information of a TP of a base station.

In one embodiment, the satellite differential assistance data transmission method provided by the embodiment of the present application further includes:

receiving differential assistance data updated periodically;

sending the updated differential assistance data to a UE.

At the UE side, an embodiment of the present application provides a positioning method, which includes:

receiving a positioning system message, and the positioning system message includes assistance information for UE location calculation, and the assistance information includes differential assistance data;

determining the location information of a UE according to the positioning system message.

With this method, the UE performs the differential calculation of precise position information according to the acquired Beidou satellite signal in combination with the differential numeric value acquired in the broadcast.

In one embodiment, the assistance information further includes a GNSS ID and an SBAS ID.

In one embodiment, the positioning method provided by the embodiment of the present application further includes:

receiving assistance information for UE location calculation updated periodically;

correcting the location information of the UE according to the updated assistance information for UE location calculation.

At the LMF entity side, an embodiment of the present application provides a satellite differential assistance data transmission apparatus, which includes:

a determining device configured to acquire the assistance information related to a Beidou satellite positioning system, and calculate the assistance information for UE location calculation, and the assistance information includes differential assistance data;

a sending device configured to send the assistance information related to the Beidou satellite positioning system to a base station through broadcasting.

Correspondingly, at the base station side, an embodiment of the present application provides a satellite differential assistance data transmission apparatus, which includes:

a receiving device configured to receive the assistance information for UE location calculation, and the assistance information includes differential assistance data;

an updating device configured to broadcast or update a positioning system message according to the assistance information, and the positioning system message carries the differential assistance data.

At the UE side, an embodiment of the present application provides a positioning apparatus, which includes:

a receiving device configured to receive a positioning system message, and the positioning system message includes assistance information for UE location calculation, and the assistance information includes differential assistance data;

a determining device configured to determine the location information of a UE according to the positioning system message.

Another embodiment of the present application provides a computing device, which includes a memory and a processor, and the memory is configured to store the program instructions, and the processor is configured to invoke the program instructions stored in the memory and perform any one of the above-mentioned methods in accordance with the obtained program.

Another embodiment of the present application provides a computer storage medium storing the computer executable instructions which are configured to cause the computer to perform any one of the above-mentioned methods.

BRIEF DESCRIPTION OF THE DRAWINGS

The embodiments of the present application are described more clearly by the accompanying figures which need to be used in describing the embodiments will be introduced below briefly. The accompanying figures described below are only some embodiments of the present application.

DETAILED DESCRIPTION OF THE EMBODIMENTS

The present application discloses a satellite differential assistance data transmission method, a positioning method and apparatus, to ensure that the Beidou satellite positioning service with high precision can be better provided on the basis of 5G or other developable technical networks.

Figure 1:
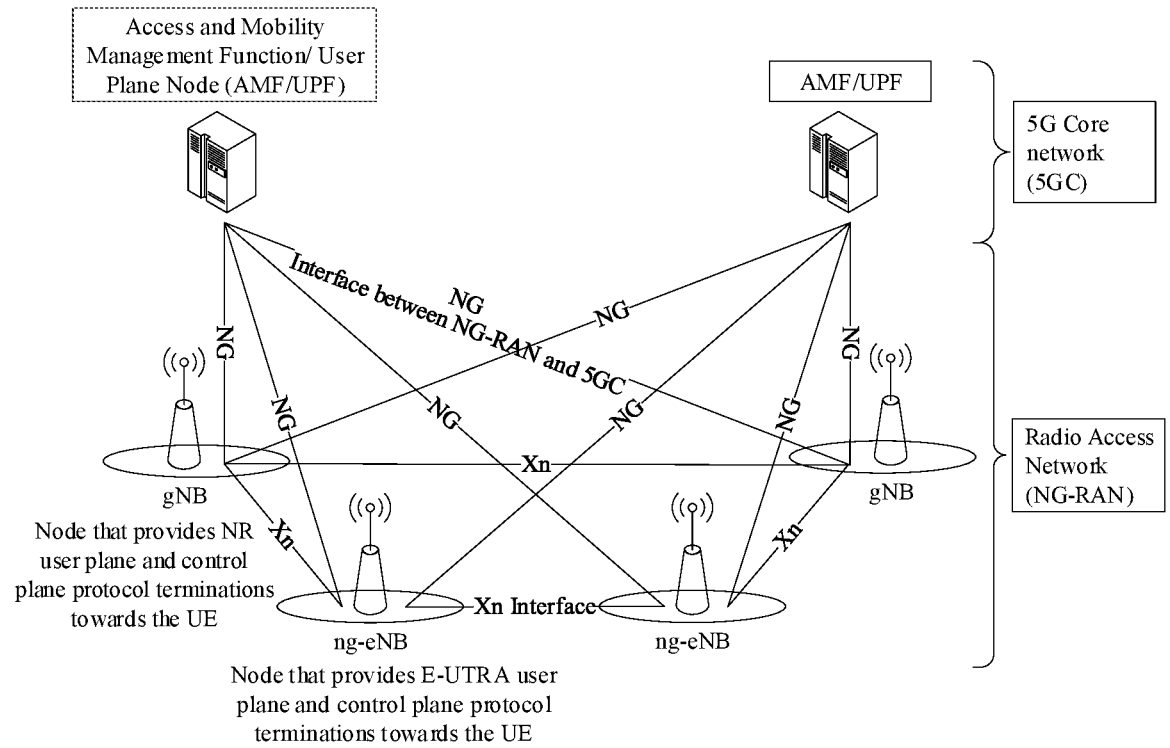
FIG. 1 is a schematic diagram of a 5G mobile communication system in the prior art.

FIG. 1 is a schematic diagram of a 5G mobile communication system in the prior art. In the 5G system, most nodes at the network side are connected by wire. As illustrated in FIG. 1, the gNBs are connected through wired links, and the gNB (NR NodeB) and core network node, e.g., Access and Mobility Management Function (AMF), User Plane Function (UPF), etc., are also connected by wired link.

Here, the ng-eNB refers to a node providing E-UTRA user plane and control plane protocol terminations towards the UE, and connected via the NG interface to the SGC.

Figure 2:
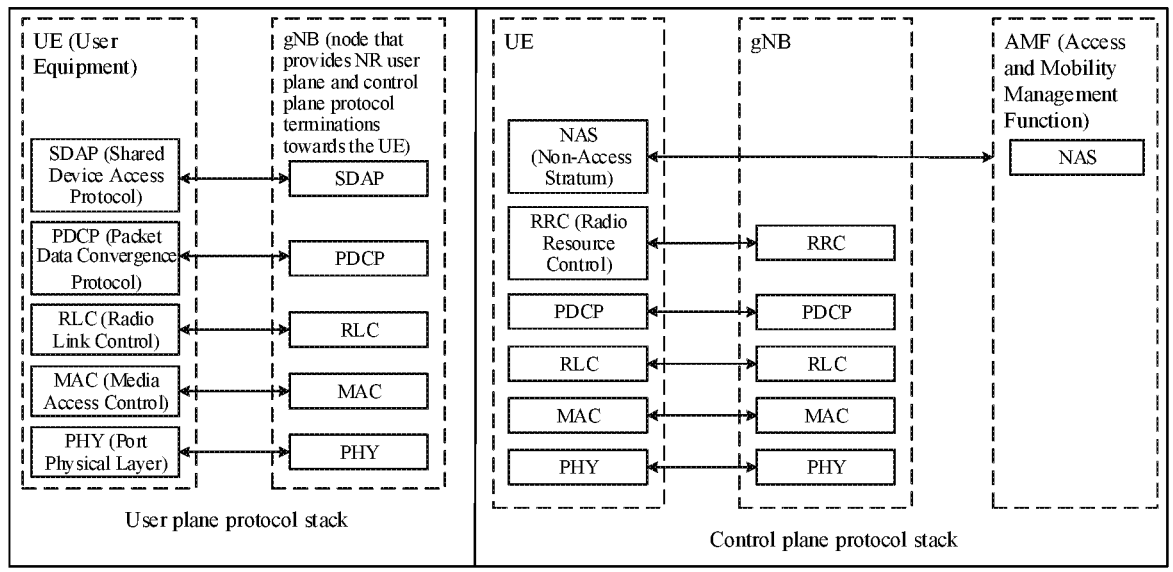
FIG. 2 is a schematic diagram of a 5G wireless protocol architecture in the prior art.

FIG. 2 is a schematic diagram of the 5G wireless protocol architecture in the prior art. The 5G basic user plane protocol layer includes Shared Device Access Protocol (SDAP), Packet Data Convergence Protocol (PDCP), Radio Link Control (RLC) and Media Access Control (MAC), Port Physical Layer (PHY). The control plane protocol layer includes Non-Access Stratum (NAS), Radio Resource Control (RRC), PDCP, RLC, MAC and PHY. The protocol stack architecture of the user plane and the control plane refers to FIG. 2.

Figure 3:
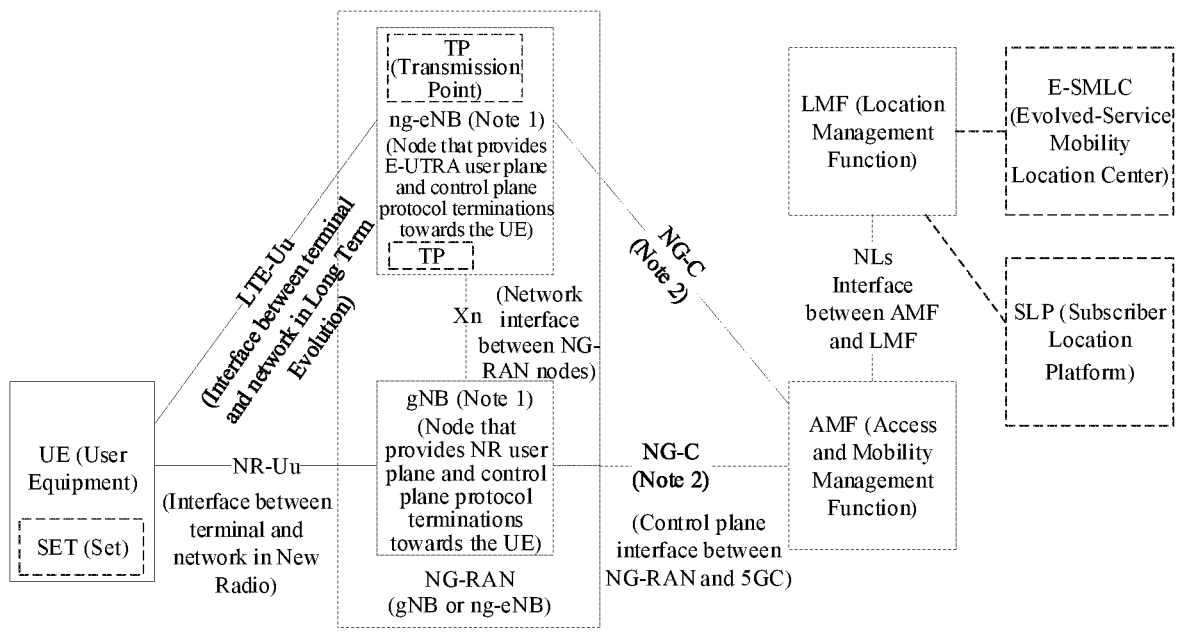
FIG. 3 is a schematic diagram of a 5G positioning network architecture in the prior art.

FIG. 3 is a schematic diagram of a 5G positioning network architecture in the prior art. This is a service-based location service network architecture, and the Location Management Function (LMF) has the following functions: support location calculation, obtain a downlink location measurement result or location estimation from the UE, obtain an uplink location measurement result from the Radio Access Network (RAN) side, obtain the assistance data from the RAN side, and so on.

The embodiments of the present application may be applicable to various systems, especially 5G systems. For example, the applicable systems may be: Global System of Mobile communication (GSM) system, Code Division Multiple Access (CDMA) system, Wideband Code Division Multiple Access (WCDMA) system, General Packet Radio Service (GPRS) system, Long Term Evolution (LTE) system, LTE Frequency Division Duplex (FDD) system, LTE Time Division Duplex (TDD) system, Universal Mobile Telecommunication System (UMTS), Worldwide interoperability for Microwave Access (WiMAX) system, 5G system and 5G NR system, etc. These systems all include terminal devices and network devices.

The terminal device involved in the embodiments of the present application may be a device that only provides the voice and/or data connectivity to the user, a handheld device with the wireless connection function, or other processing device connected to the wireless modem. In different systems, the terminal device may have different names. For example, in a 5G system, the terminal device may be referred to as User Equipment (UE). The wireless terminal device can communicate with one or more core networks via the RAN, and the wireless terminal device can be a mobile terminal, such as a mobile telephone (or called "cellular" telephone), and a computer with the mobile terminal, for example, can be a portable, pocket, handheld, computer built-in or vehicle-carried mobile device, and they exchange the voice and/or data with the radio access network. For example, Personal Communication Service (PCS) telephone, cordless telephone, Session Initiation Protocol (SIP) telephone, Wireless Local Loop (WLL) station, Personal Digital Assistant (PDA) and other devices. The wireless terminal device can also be called system, subscriber device, subscriber station, mobile station, mobile, remote station, access point, remote terminal, access terminal, user terminal, user agent, user device, which is not limited in the embodiments of the present application.

The network device involved in the embodiments of the present application may be a base station, which may include a plurality of cells. Depending on specific application scenarios, the base station may also be called access point, or may refer to the device in the access network communicating with the wireless terminal via one or more sectors over the air interface or other names. The network device may be used to perform the inter-conversion between the received air frame and Internet Protocol (IP) packet, and used as the router between the wireless terminal device and the rest of the access network, and the rest of the access network may include IP networks. The network device can further coordinate the attribute management of the air interface. For example, the network device involved in the embodiments of the present application can be a network device (Base Transceiver Station (BTS)) in the Global System of Mobile communication (GSM) or Code Division Multiple Access (CDMA), or can be a network device (NodeB) in the Wideband Code Division Multiple Access (WCDMA), or can be an evolutional network device (evolutional Node B (eNB or e-NodeB)) in the Long Term Evolution (LTE) system, a 5G base station in the 5G network architecture (next generation system), or can be a Home evolved Node B (HeNB), a relay node, femto, pico, etc., which is not limited in the embodiments of the present application.

The embodiments of the present application will be described below in detail with reference to the drawings of the specification. It should be noted that the showing order of the embodiments of the present application only represents the sequential order of the embodiments, but does not represent the pros and cons of the embodiments, and the described embodiments are only a part of the embodiments of the present application but not all the embodiments.

In the embodiments of the present application, the LMF provides the Beidou-related assistance information to a 5G base station, where the information includes differential assistance data, GNSS ID, SBAS ID and other information. In addition, the LMF can set whether the assistance information needs to be encrypted, that is, the LMF carries a decryption instruction at the same time. The UE decrypts the data with the key of corresponding level according to the decryption instruction; and the LMF decides to update the Beidou-related differential assistance data to the corresponding 5G base station at regular intervals.

When the 5G base station receives the assistance information sent by the LMF through broadcasting, the 5G base station triggers the broadcast or update of the positioning system message according to the broadcast cycle from the LMF or the indication on whether to enable the broadcast, and returns a feedback message of assistance data update configuration, where the feedback message can carry the information indicating the configuration is failed or successful. The 5G base station will broadcast or update the Beidou-related assistance data in a designated or pre-configured cell according to the latest configuration information.

In order to perform the Beidou location with high precision, the UE obtains the required Beidou-related assistance data based on the received positioning-related broadcast information, and then performs the corresponding positioning measurements according to the GNSS ID and SBAS ID in the broadcast information. For example, UE receives a new Beidou signal, and calculates the accurate location information in combination with the Beidou-related assistance data.

Here, the Beidou-related assistance information is confirmed through the LPPa protocol interaction between the 5G base station and LMF. For example, the 5G base station provides its own precise location, the precise location of the cell belonging to the 5G base station, or the precise location information of the TP of the 5G base station to the LMF; or feeds back its own precise location, the precise location of the cell under its jurisdiction, or the precise geographic location of the transmission point of the 5G base station according to the assistance information request message initiated by the LMF.

Figure 4:
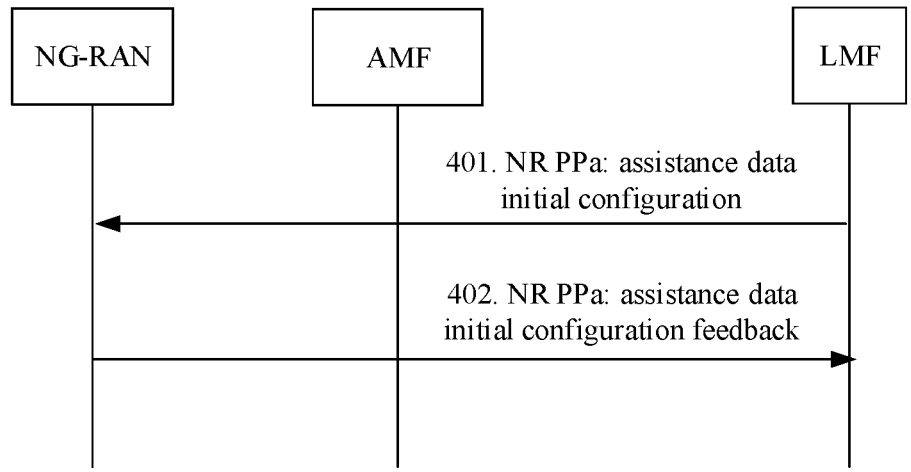
FIG. 4 is a schematic flowchart of a Beidou assistance data transmission method provided by embodiments of the present application.

First embodiment: a Beidou assistance data (differential data) transmission process, referring to FIG. 4 for details, includes the following operations.

Operation 401: the LMF decides to provide the Beidou-related differential assistance data to the 5G base station (NR gNB). In one embodiment, the generated differential assistance data constitutes a System Information Block (SIB) in the form of NR PPa, and then generates a corresponding NR PPa message together with the broadcast cycle, whether to encrypt and other information, where the message also needs to carry the GNSS ID (such as: identity of Beidou satellite navigation system BDS) and SBAS ID information that belongs to the Beidou-related differential assistance data. The assistance data configuration message from the LMF may include an indication to start or stop the broadcast.

Operation 402: the 5G base station (NR gNB) will return a feedback message of assistance data initial configuration, which may carry the information indicating the configuration is failed or successful.

The 5G base station (NR gNB) will decide to broadcast or stop broadcasting the Beidou-related differential assistance data in a designated or pre-configured cell according to the configuration information.

Figure 5:
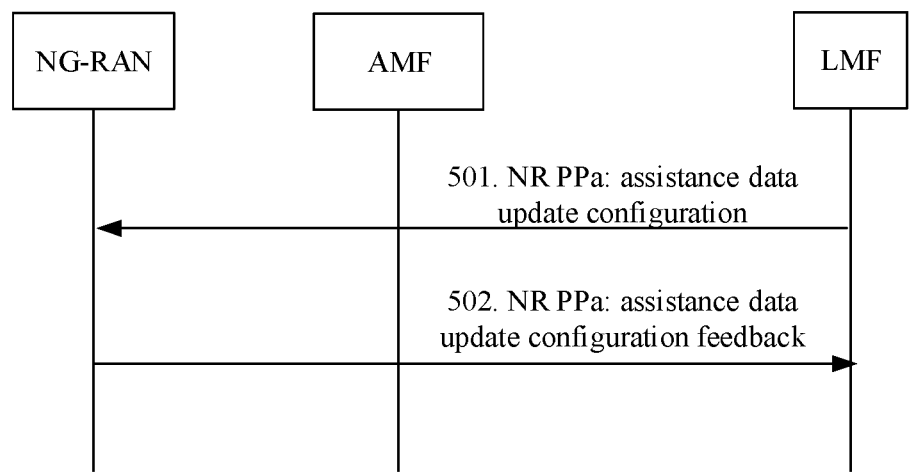
FIG. 5 is a schematic flowchart of a Beidou assistance data update method provided by embodiments of the present application.

Second embodiment: a Beidou assistance data (differential data) update process, referring to FIG. 5 for details, includes the following operations.

Operation 501: the LMF decides to update the Beidou-related differential assistance data towards the corresponding 5G base station (NR gNB) at regular intervals. In one embodiment, the updated differential assistance data constitutes an SIB (System Information Block) in the form of NR PPa, and then the updated broadcast cycle or encryption indication information may be added to generate a corresponding NR PPa message, where the message also needs to carry the GNSS ID (such as: BDS) and SBAS ID information that belongs to the Beidou-related differential assistance data.

Here, there is a need to transfer between the LMF entity side and the RAN side through the AMF protocol, and the direct transmission cannot be performed between the LMF and the RAN.

Operation 502: the 5G base station (NR gNB) will update the stored configuration according to the GNSS ID and SBAS ID, and then return a feedback message of assistance data update configuration, which can carry the information indicating the configuration is failed or successful.

The 5G base station (NR gNB) will decide to update the broadcast Beidou-related differential assistance data in a designated or pre-configured cell according to the latest configuration information.

Figure 6:
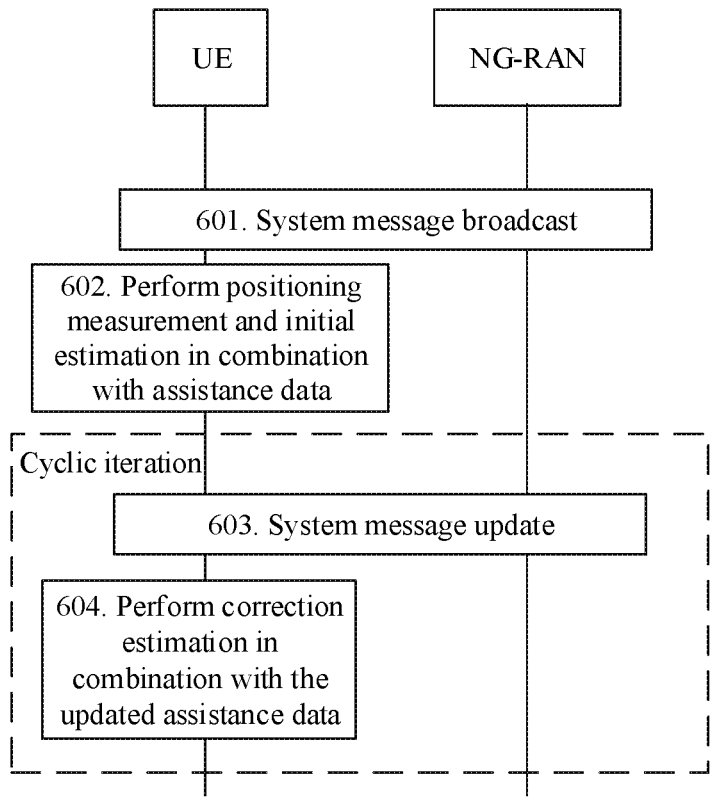
FIG. 6 is a schematic flowchart of a system broadcast method of Beidou assistance data provided by embodiments of the present application.
Figure 7:
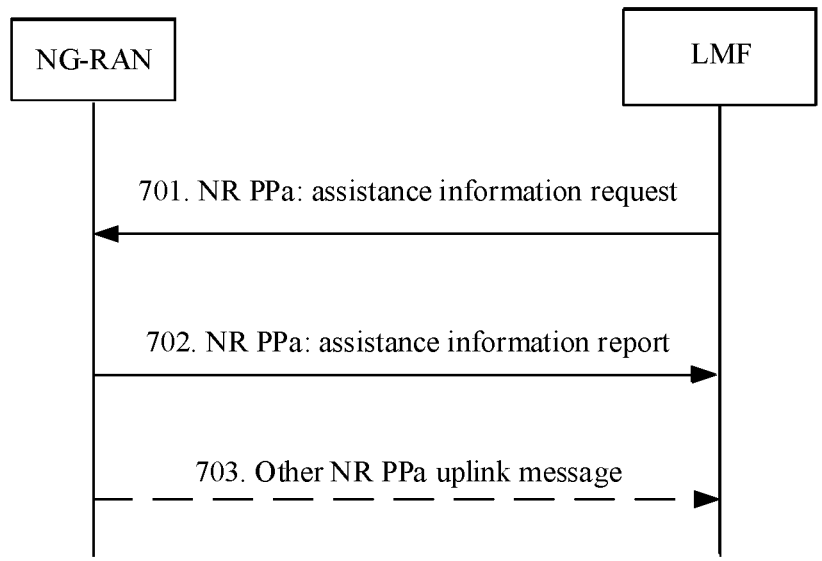
FIG. 7 is a schematic diagram of an assistance information interaction process between a base station and an LMF provided by embodiments of the present application.

Third embodiment: a system broadcasting process of Beidou assistance data (differential data), referring to FIG. 6, includes the following operations.

Operation 601: in order to perform the Beidou positioning with high precision, the UE obtains the required Beidou-related assistance data based on the received positioning-related broadcast information.

Operation 602: the UE performs the corresponding positioning measurement according to the GNSS ID (such as: BDS) and SBAS ID, for example, receives a new Beidou signal, and calculates the initial position information in combination with the Beidou-related assistance data.

Here, the UE performs the differential calculation for precise position information according to the acquired Beidou satellite signal in combination with the differential data acquired in the broadcast.

Operation 603: the UE obtains the updated Beidou-related assistance data.

Operation 604: the UE corrects the UE position estimation according to the updated Beidou assistance data, that is, corrects the UE position according to the periodically-updated differential data.

The UE iterates the operations 603 to 604 repeatedly until it obtains the UE position estimation with sufficient precision (the update period is 1 s, which can reach the positioning precision of decimeter level), where the number of iterations depends on the algorithm implementation.

Fourth embodiment: an assistance information interaction process between the base station and the LMF, referring to FIG. 6, includes the following operations.

Operation 701: in order to calculate the Beidou differential data, the LMF needs to know the precise location information used to locate the 5G base station and sends an assistance information request message which may contain the specified cell information.

The cell information is, for example, the cell ID and Real Time Transport Protocol (TRP) ID.

After the LMF sends the assistance information request message, the target cell will return its precise geographic location, and then the LMF calculates the differential data of the base station according to the precise position information of the base station in combination with the differential data of adjacent satellite reference stations.

Operation 702: the 5G base station (NR gNB) feeds back an assistance information report message to the LMF, where the message contains at least the precise location information of the cell under its jurisdiction (or cell designated by the LMF) or the TP.

Operation 703: In one embodiment, the 5G base station (NR gNB) is allowed to carry the assistance information to the LMF independently through other NR PPa uplink message (sent by the NG-RAN to the LMF), where the message contains at least the precise position information of the cell of the base station (or cell designated by the LMF) or the TP of the base station.

Here, the LMF calculates the differential numeric value of the base station according to the precise position information of the base station in combination with the differential data of adjacent satellite reference stations, and then transmits this numeric value to the UE as the positioning compensation value of the UE.

Here, the method and apparatus are based on the same application concept. Since the principle of solving the problem in the method is similar to that in the apparatus, the implementations of the apparatus and method can refer to each other, and the repeated description thereof will be omitted.

Figure 8:
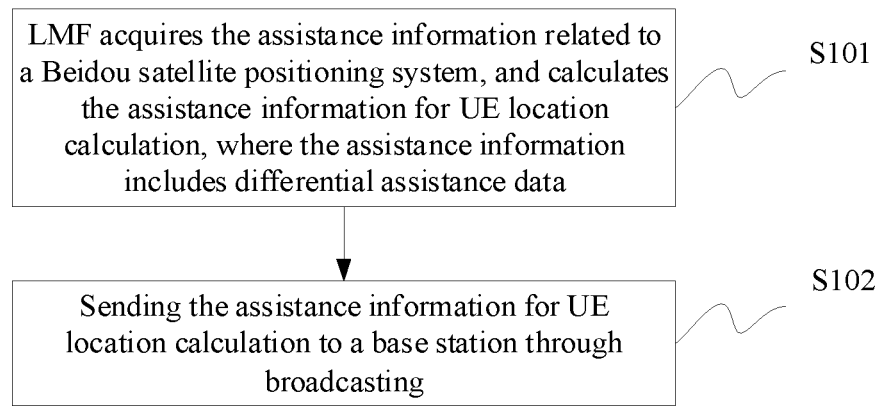
FIG. 8 is a schematic flowchart of a satellite differential assistance data transmission method provided at the LMF side according to embodiments of the present application.

In view of the above, at the LMF entity side, embodiments of the present application provide a satellite differential assistance data transmission method, referring to FIG. 8, including the following.

S101: acquiring the assistance information related to a Beidou satellite positioning system, and calculating the assistance information for UE location calculation, where the assistance information includes differential assistance data.

S102: sending the assistance information for UE location calculation to a 5G base station through broadcasting.

In one embodiment, the assistance information for UE location calculation further includes an Identity of Global Navigation Satellite System (GNSS ID) and an Identity of Space Based Augmentation System (SBAS ID).

In one embodiment, the assistance information for UE location calculation further includes an indication to confirm whether the differential assistance data is encrypted.

In one embodiment, the satellite differential assistance data transmission method further includes:
receiving the assistance information sent by the base station for assisting in determining the differential assistance data for UE location calculation;
the differential assistance data for UE location calculation is determined according to the assistance information for assisting in determining the differential assistance data for UE location calculation;
and the differential assistance data for UE location calculation refers to differential assistance data of a serving base station, or a serving cell, or a TP of a serving base station of a UE.

In one embodiment, the assistance information for assisting in determining the differential assistance data for UE location calculation includes:
the geographic location information of the base station, or the geographic location information of a cell of the base station, or the geographic location information of the TP of the base station.

In one embodiment, the method further includes: acquiring the assistance information sent by a space based augmentation system for calculating the differential assistance data for UE location calculation, where the assistance information contains but not limited to differential assistance data of the space based augmentation system.

In one embodiment, the satellite differential assistance data transmission method further includes:
updating the differential assistance data periodically, and sending the updated differential assistance data to the base station.

Figure 9:
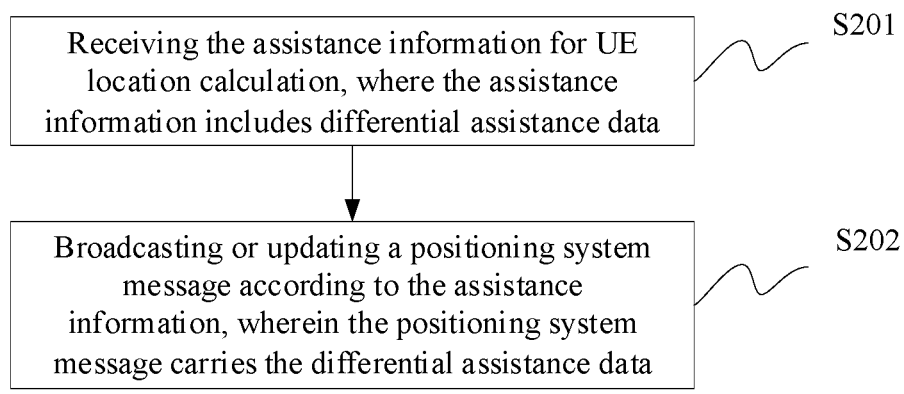
FIG. 9 is a schematic flowchart of a satellite differential assistance data transmission method provided at the base station side according to embodiments of the present application.

Correspondingly, at the base station side, embodiments of the present application provide a satellite differential assistance data transmission method, referring to FIG. 9, including the following.

S201: receiving the assistance information for UE location calculation, where the assistance information includes differential assistance data.

S202: broadcasting or updating a positioning system message according to the assistance information, where the positioning system message carries the differential assistance data.

In one embodiment, the assistance information further includes a GNSS ID and an SBAS ID.

In one embodiment, the assistance information further includes an indication to confirm whether the differential assistance data is encrypted.

In one embodiment, the satellite differential assistance data processing method further includes:
sending the assistance information for assisting in determining the differential assistance data for UE location calculation to an LMF.

In one embodiment, the assistance information for assisting in determining the differential assistance data for UE location calculation includes:
the geographic location information of a base station, or the geographic location information of a cell of a base station, or the geographic location information of a TP of a base station.

In one embodiment, the satellite differential assistance data processing method further includes:
receiving the differential assistance data updated periodically;
sending the updated differential assistance data to a UE.

Figure 10:
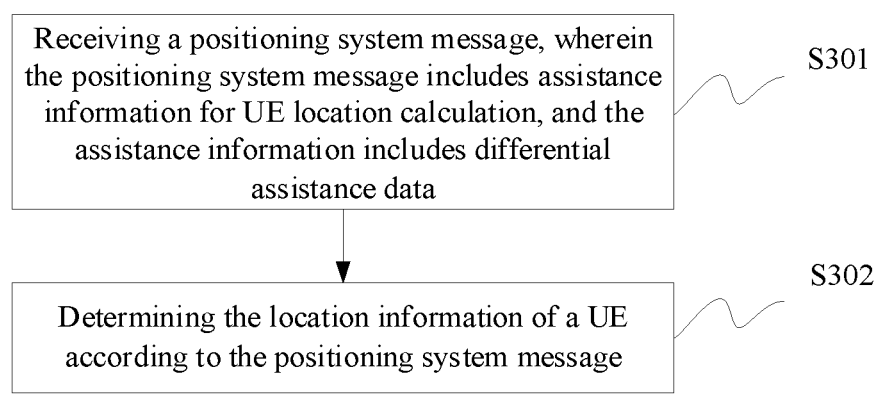
FIG. 10 is a schematic flowchart of a positioning method provided at the UE side according to embodiments of the present application.

At the UE side, an embodiment of the present application provides a positioning method, referring to FIG. 10, including the following.

S301: receiving a positioning system message, where the positioning system message includes assistance information for UE location calculation, where the assistance information includes differential assistance data.

S302: determining the location information of a UE according to the positioning system message.

In one embodiment, the assistance information further includes a GNSS ID and an SBAS ID.

In one embodiment, the satellite differential assistance data processing method further includes:
receiving the assistance information for UE location calculation updated periodically;
correcting the location information of the UE according to the updated assistance information for UE location calculation.

Figure 11:
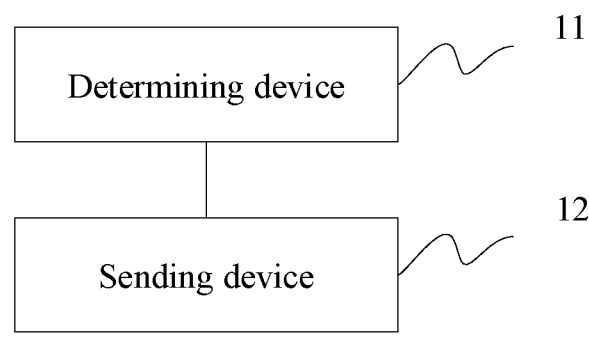
FIG. 11 is a structural schematic diagram of a satellite differential assistance data transmission apparatus provided at the LMF side according to embodiments of the present application.

At the LMF entity side, embodiments of the present application provide a satellite differential assistance data transmission apparatus, referring to FIG. 11, including:
a determining device 11 configured to acquire and calculate the assistance information related to a Beidou satellite positioning system, where the assistance information includes but not limited to differential assistance data;
a sending device 12 configured to send the assistance information related to the Beidou satellite positioning system to a 5G base station through broadcasting.

Figure 12:
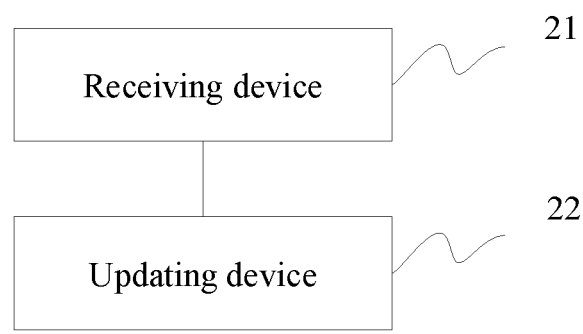
FIG. 12 is a structural schematic diagram of a satellite differential assistance data transmission apparatus provided at the base station side according to embodiments of the present application.

Correspondingly, at the base station side, an embodiment of the present application provides a satellite differential assistance data transmission apparatus, referring to FIG. 12, including:

a receiving device 21 configured to receive the assistance information for UE location calculation, where the assistance information includes but not limited to differential assistance data;

an updating device 22 configured to broadcast or update a positioning system message according to the assistance information, where the positioning system message carries the differential assistance data.

Figure 13:
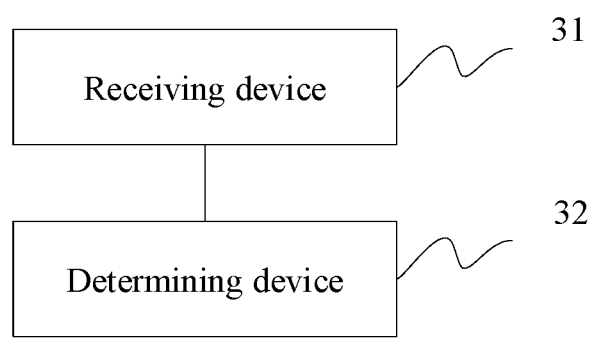
FIG. 13 is a structural schematic diagram of a positioning apparatus provided at the UE side according to embodiments of the present application.

At the UE side, an embodiment of the present application provides a positioning apparatus, referring to FIG. 13, including:

a receiving device 31 configured to receive a positioning system message, where the positioning system message includes assistance information for UE location calculation, and the assistance information includes but not limited to differential assistance data;

a determining device 32 configured to determine the location information of a UE according to the positioning system message.

It should be noted that the division of devices in the embodiments of the present application is illustrative, and is merely a kind of logical function division, and there may be other division methods in actual implementations. In addition, the functional devices in each embodiment of the present application may be integrated into one processing device, or each device may exist alone physically, or two or more devices may be integrated into one device. The above-mentioned integrated devices can be implemented in the form of hardware, or can be implemented in the form of software functional devices.

When the integrated device is implemented in the form of software functional device and sold or used as an independent product, it may be stored in a computer readable storage medium. Based on such understanding, the present application essentially or a part that contributes to the prior art or all or a part may be embodied in the form of software product. The computer software product is stored in a storage medium, and includes several instructions used to enable a computer device (which may be a personal computer, server, or network device, etc.) or a processor to perform all or some of the operations of the methods of various embodiments of the present application. The above-mentioned storage medium includes: USB flash drive, mobile hard disk, Read-Only Memory (ROM), Random Access Memory (RAM), magnetic disk or compact disc or various media that can store the program codes.

An embodiment of the present application provides a computing device, which can be a desktop computer, a portable computer, a smart phone, a tablet computer, a Personal Digital Assistant (PDA) or the like. The computing device can include a Center Processing Unit (CPU), a memory, input/output devices and the like. The input device can include a keyboard, a mouse, a touch screen and the like, and the output device can include a display device such as Liquid Crystal Display (LCD), Cathode Ray Tube (CRT) or the like.

The memory can include a Read-Only Memory (ROM) and a Random Access Memory (RAM), and provide the program instructions and data stored in the memory to the processor. In an embodiment of the present application, the memory may be used to store the program of any one of the methods provided by the embodiments of the present application.

The processor invokes the program instructions stored in the memory and is configured to perform any one of the methods provided by the embodiments of the present application in accordance with the obtained program instructions.

An embodiment of the present application provides a computer storage medium for storing the computer program instructions used by the apparatuses provided by the embodiments of the present application described above, where the computer storage medium contains the program for performing any one of the methods provided by the embodiments of the present application described above.

Figure 14:
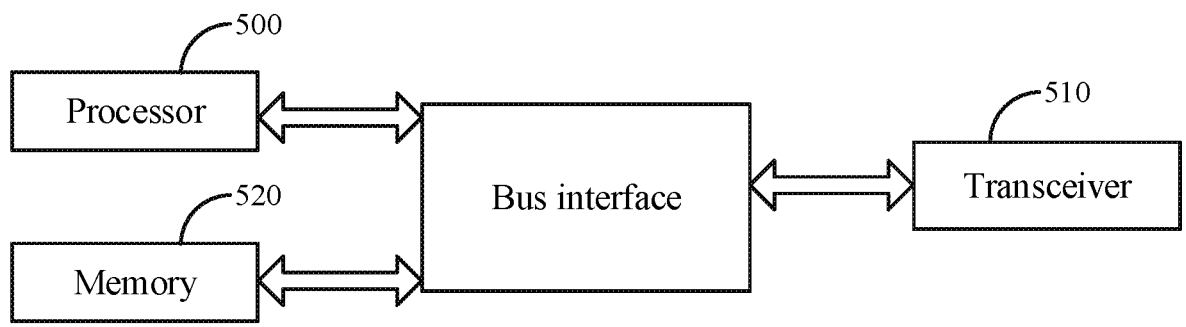
FIG. 14 is a structural schematic diagram of a satellite differential assistance data transmission apparatus provided by embodiments of the present application.

At the LMF side, embodiments of the present application provide a satellite differential assistance data transmission apparatus, referring to FIG. 14, including:

a processor 500 configured to read the programs in a memory 520 to perform the process of:

acquiring and calculating the assistance information related to a Beidou satellite positioning system, where the assistance information includes but not limited to differential assistance data;

sending the assistance information related to the Beidou satellite positioning system to a 5G base station through broadcasting via a transceiver 510.

In one embodiment, the assistance information for UE location calculation further includes an Identity of Global Navigation Satellite System (GNSS ID) and an Identity of Space Based Augmentation System (SBAS ID).

In one embodiment, the assistance information for UE location calculation further includes an indication to confirm whether the differential assistance data is encrypted.

In one embodiment, the LMF entity receives the assistance information sent by the base station for assisting in determining the differential assistance data for UE location calculation; and the differential assistance data for UE location calculation is determined according to the assistance information for assisting in determining the differential assistance data for UE location calculation;

where the differential assistance data for UE location calculation refers to differential assistance data of a serving base station, or a serving cell, or a TP of a serving base station of a UE.

In one embodiment, the assistance information for assisting in determining the differential assistance data for UE location calculation includes:

the geographic location information of the base station, or the geographic location information of a cell under the jurisdiction of the base station, or the geographic location information of the TP of the base station.

In one embodiment, the processor 500 is further configured to:

acquire the assistance information sent by a space based augmentation system for calculating the differential assistance data for UE location calculation, where the assistance information contains but not limited to differential assistance data of the space based augmentation system.

In one embodiment, the processor 500 is further configured to:

update the differential assistance data periodically, and send the updated differential assistance data to the base station periodically via the transceiver 510.

The transceiver 510 is configured to receive and send the data under the control of the processor 500.

In a case at the base station side, the processor 500 is configured to read the programs in the memory 520 to perform the process of:

receiving the assistance information for UE location calculation via the transceiver 510, where the assistance information includes but not limited to differential assistance data;

broadcasting or updating a positioning system message according to the assistance information, and the positioning system message carries the differential assistance data.

In one embodiment, the assistance information further includes a GNSS ID and an SBAS ID.

In one embodiment, the assistance information further includes an indication to confirm whether the differential assistance data is encrypted.

In one embodiment, the processor 500 is further configured to: send the assistance information for assisting in determining the differential assistance data for UE location calculation to the LMF entity via the transceiver 510.

In one embodiment, the assistance information for assisting in determining the differential assistance data for UE location calculation includes:

the geographic location information of a base station, or the geographic location information of a cell under the jurisdiction of a base station, or the geographic location information of a TP of a base station.

In one embodiment, the processor 500 is further configured to:

receive the differential assistance data updated periodically via the transceiver 510;

send the updated differential assistance data to a UE via the transceiver 510.

The transceiver 510 is configured to receive and send the data under the control of the processor 500.

The computer storage medium may be any available media or data storage device accessible to the computer, including but not limited to magnetic memory (e.g., floppy disk, hard disk, magnetic tape, Magnetic Optical disc (MO) or the like), optical memory (e.g., CD, DVD, BD, HVD or the like), semiconductor memory (e.g., ROM, EPROM, EEPROM, nonvolatile memory (NAND FLASH), Solid State Disk (SSD)) or the like.

Figure 15:
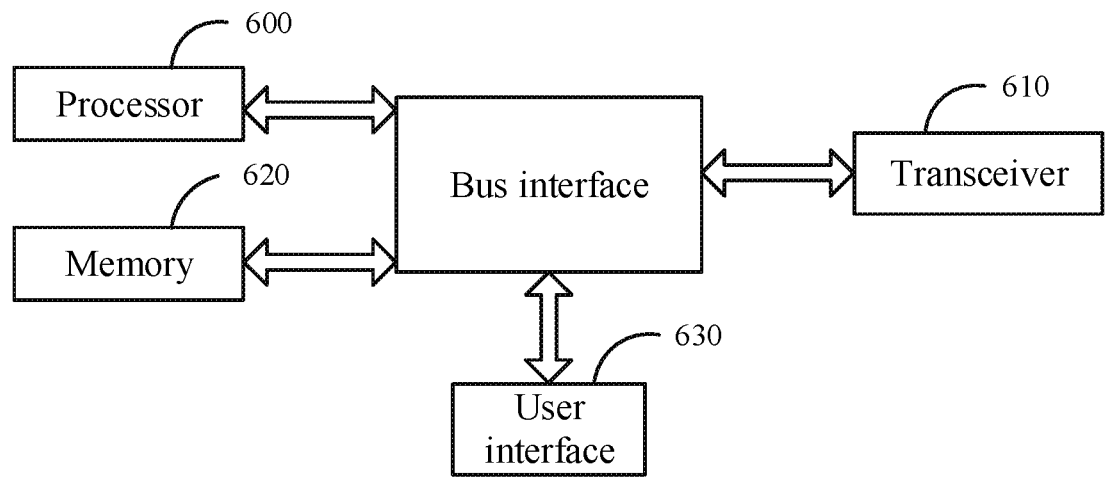
FIG. 15 is a structural schematic diagram of a positioning apparatus provided at the user equipment side according to embodiments of the present application.

At the user equipment side, embodiments of the present application provide a positioning apparatus, referring to FIG. 15, including:

a processor 600 configured to read the programs in a memory 620 to perform the process of:

receiving a positioning system message via a transceiver 610, where the positioning system message includes assistance information for UE location calculation, and the assistance information includes but not limited to differential assistance data;

determining the location information of a UE according to the positioning system message.

In one embodiment, the assistance information further includes a GNSS ID and an SBAS ID.

In one embodiment, the processor 600 is further configured to:

receive the assistance information for UE location calculation updated periodically via the transceiver 610;

correct the location information of the UE according to the updated assistance information for UE location calculation.

The methods provided by the embodiments of the present application may be applied to the terminal devices, and may also be applied to the network devices.

Here, the terminal device can also referred to as the User Equipment ("UE" for short), Mobile Station ("MS" for short), Mobile Terminal ("MT" for short) or the like. In one embodiment, the terminal can has the ability of communicating with one or more core networks via the Radio Access Network (RAN). For example, the terminal can be a mobile telephone (or called "cellular" telephone), or a computer with the mobile property. For example, the terminal can also be a portable, pocket, handheld, computer built-in or vehicle-carried mobile device.

The network device may be a base station (e.g., access point), which means the device in the access network communicating with the wireless terminal via one or more sectors over the air interface. The base station may be used to perform the inter-conversion between the received air frame and the IP packet, and used as the router between the wireless terminal and the rest of the access network, and the rest of the access network may include Internet Protocol (IP) networks. The base station may further coordinate the attribute management of the air interface. For example, the base station can be the BTS in the GSM or CDMA, or can be the NodeB in the WCDMA, or can be the NodeB or eNB or e-NodeB (evolutional Node B) in the LTE, or can be the gNB in the 5G system, or the like. which is not limited in the embodiments of the present application.

The processing flows of the above methods may be implemented by a software program, which may be stored in a storage medium. When the stored software program is invoked, the above method operations are performed.

In summary, the present application discloses a satellite differential assistance data transmission method, a positioning method and apparatus, to ensure that the Beidou satellite positioning service with high precision can be better provided on the basis of 5G or other developable technical networks.

The embodiments of the present application can provide methods, systems and computer program products. Thus the present application can take the form of hardware embodiments alone, software embodiments alone, or embodiments combining the software and hardware aspects. Also the present application can take the form of computer program products implemented on one or more computer usable storage mediums (including but not limited to magnetic disk memories, optical memories and the like) containing computer usable program codes therein.

The present application is described by reference to the flow charts and/or the block diagrams of the methods, the devices (systems) and the computer program products according to the embodiments of the present application. It should be understood that each process and/or block in the flow charts and/or the block diagrams, and a combination of processes and/or blocks in the flow charts and/or the block diagrams can be implemented by the computer program instructions. These computer program instructions can be provided to a general-purpose computer, a dedicated computer, an embedded processor, or a processor of another programmable data processing device to produce a machine, so that an apparatus for implementing the functions specified in one or more processes of the flow charts and/or one or more blocks of the block diagrams is produced by the instructions executed by the computer or the processor of another programmable data processing device.

These computer program instructions can also be stored in a computer readable memory which guides the computer or another programmable data processing device to operate in a particular way, so that the instructions stored in the computer readable memory produce a manufacture including the instruction apparatus which implements the functions specified in one or more processes of the flow charts and/or one or more blocks of the block diagrams.

These computer program instructions can also be loaded onto the computer or another programmable data processing device, so that a series of operation operations are performed on the computer or another programmable device to produce the computer-implemented processing. Thus the instructions executed on the computer or another programmable device provide operations for implementing the functions specified in one or more processes of the flow charts and/or one or more blocks of the block diagrams.

What is claimed is:

1. A satellite differential assistance data transmission method, comprising:
   acquiring, by a Location Management Function, LMF, entity, assistance information related to a Beidou satellite positioning system, and calculating assistance information for UE location calculation, wherein the assistance information for UE location calculation comprises differential assistance data;
   sending the assistance information for UE location calculation to a base station through broadcasting; and
   updating, by the LMF entity, the differential assistance data periodically, and sending the updated differential assistance data to the base station.

2. The method according to claim 1, wherein the assistance information for UE location calculation further comprises an Identity of Global Navigation Satellite System, GNSS ID, and an Identity of Space Based Augmentation System, SBAS ID.

3. The method according to claim 1, wherein the assistance information for UE location calculation further comprises an indication to confirm whether the differential assistance data is encrypted.

4. The method according to claim 1, wherein the method further comprises: receiving assistance information sent by the base station for assisting in determining the differential assistance data for UE location calculation;
   the differential assistance data for UE location calculation is determined according to the assistance information for assisting in determining the differential assistance data for UE location calculation;
   wherein the differential assistance data for UE location calculation refers to differential assistance data of a serving base station, or a serving cell, or a Transmission Point, TP, of a serving base station, of a UE.

5. The method according to claim 4, wherein the assistance information for assisting in determining the differential assistance data for UE location calculation comprises:
   geographic location information of the base station, or geographic location information of a cell of the base station, or geographic location information of a TP of the base station.

6. The method according to claim 1, wherein the method further comprises: acquiring assistance information sent by a space based augmentation system for calculating the differential assistance data for UE location calculation, wherein the assistance information for calculating the differential assistance data for UE location calculation contains differential assistance data of the space based augmentation system.

7. A satellite differential assistance data transmission apparatus, comprising:
   a memory configured to store program instructions;
   a processor configured to invoke the program instructions stored in the memory and perform the method of claim 1 in accordance with the obtained program.

8. A non-transitory computer storage medium, wherein the computer storage medium stores computer executable instructions which are configured to cause the computer to perform the method of claim 1.

9. A satellite differential assistance data transmission method, comprising:
   receiving assistance information for UE location calculation, wherein the assistance information comprises differential assistance data;
   broadcasting or updating a positioning system message according to the assistance information, wherein the positioning system message carries the differential assistance data;
   wherein the method further comprises:
   receiving differential assistance data updated periodically;
   sending the updated differential assistance data to a User Equipment, UE.

10. The method according to claim 9, wherein the assistance information further comprises an Identity of Global Navigation Satellite System, GNSS ID, and an Identity of Space Based Augmentation System, SBAS ID.

11. The method according to claim 9, wherein the assistance information further comprises an indication to confirm whether the differential assistance data is encrypted.

12. The method according to claim 11, wherein the assistance information for assisting in determining the differential assistance data for UE location calculation comprises:
   geographic location information of a base station, or geographic location information of a cell of a base station, or geographic location information of a TP of a base station.

13. The method according to claim 9, wherein the method further comprises:
   sending assistance information for assisting in determining the differential assistance data for UE location calculation to an LW;
   wherein the differential assistance data for UE location calculation refers to differential assistance data of a serving base station, or a serving cell, or a Transmission Point, TP, of a serving base station, of a UE.

14. A satellite differential assistance data transmission apparatus, comprising:
   a memory configured to store program instructions;
   a processor configured to invoke the program instructions stored in the memory and perform the method of claim 8 in accordance with the obtained program.

15. A positioning method, comprising:
   receiving a positioning system message, wherein the positioning system message comprises assistance information for User Equipment, UE, location calculation, and the assistance information comprises differential assistance data;
   determining location information of a UE according to the positioning system message;
   wherein the method further comprises:
   receiving assistance information for UE location calculation updated periodically;
   correcting the location information of the UE according to the updated assistance information for UE location calculation.

16. The method according to claim 15, wherein the assistance information further comprises an Identity of Global Navigation Satellite System, GNSS ID, and an Identity of Space Based Augmentation System, SBAS ID.

17. A satellite differential assistance data transmission apparatus, comprising:
   a memory configured to store program instructions;

a processor configured to invoke the program instructions stored in the memory and perform the method of claim 15 in accordance with the obtained program.

\* \* \* \* \*